UNITED STATES PATENT OFFICE.

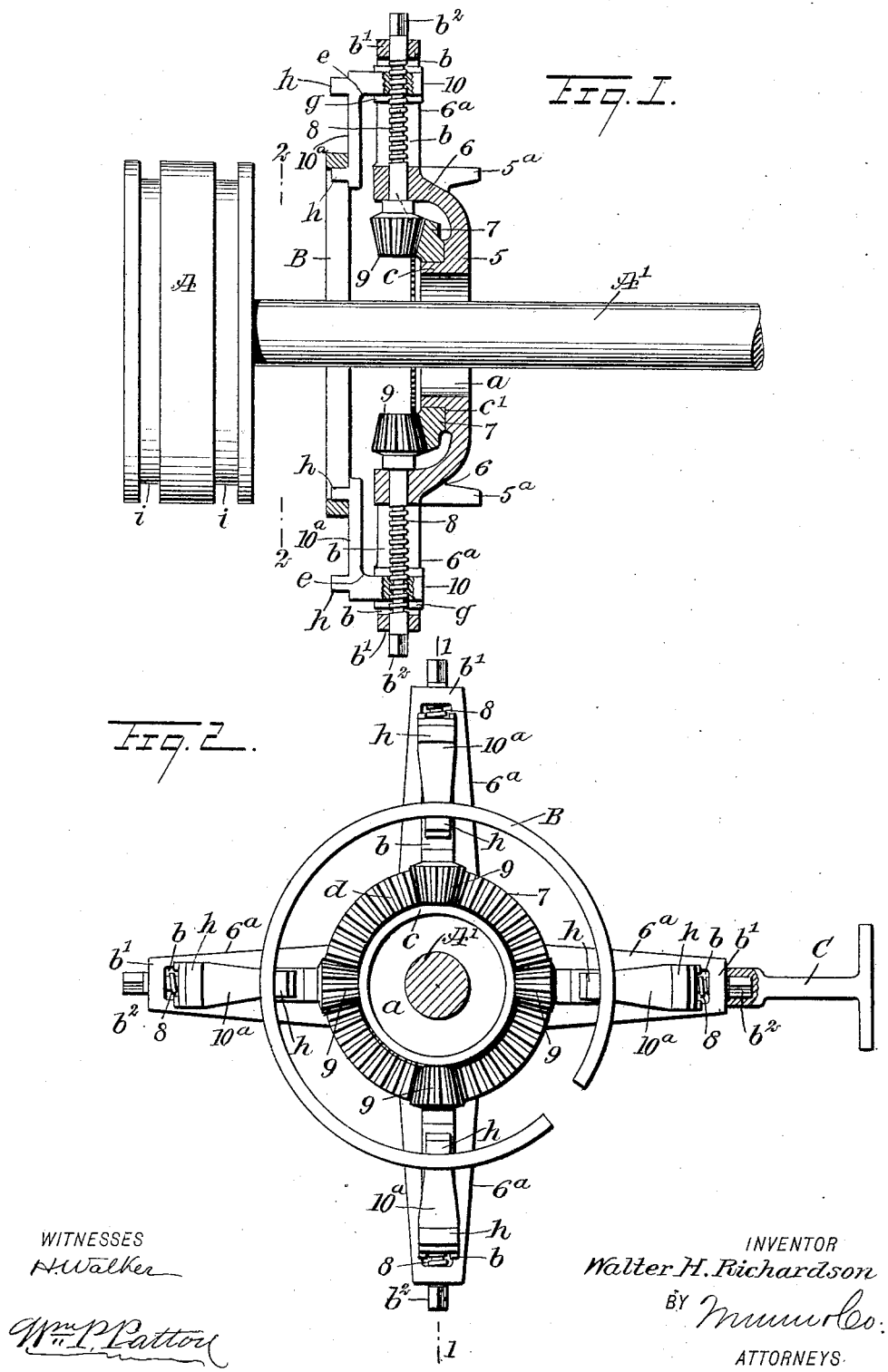

WALTER HENRY RICHARDSON, OF BRUNSWICK, GEORGIA.

PACKING-RING EXPANDER.

No. 912,031.  Specification of Letters Patent.  Patented Feb. 9, 1909.

Application filed April 17, 1908. Serial No. 427,646.

*To all whom it may concern:*

Be it known that I, WALTER H. RICHARDSON, a citizen of the United States, and a resident of Brunswick, in the county of Glynn and State of Georgia, have invented a new and Improved Packing-Ring Expander, of which the following is a full, clear, and exact description.

The pistons of steam engines usually have peripheral channels, wherein resilient split packing rings are placed, which closely fit within the bore of the steam cylinder and serve to pack the piston. In order to render the packing rings effective in service, they are formed of a thickness that renders it very difficult to expand them sufficiently to permit of their slipping over the periphery of the piston, so as to enter them within the channels they are to occupy; and in efforts to effect such a result the rings are sometimes defaced so as to require repair in order to render them serviceable.

The purpose of this invention is to provide a novel, simple and practical device that will afford convenient and easily operated means, that may be readily engaged with a split resilient packing ring, and by adjustment thereof quickly and evenly expand the engaged ring, so that it may be slipped upon the periphery of a piston, and when in place be released for its sliding introduction into the channel it is to be seated in.

The invention consists in the novel construction and combination of parts, as is hereinafter described and defined in the appended claim.

Reference is to be had to the accompanying drawings forming a part of this specification, in which similar characters of reference indicate corresponding parts in both views.

Figure 1 is a sectional side view, taken substantially on the line 1—1 in Fig. 2, and Fig. 2 is a transverse partly sectional view, substantially on the line 2—2 in Fig. 1.

The frame for the expander device is preferably cast from suitable metal, and comprises an annular body portion 5, having a circularly walled opening $a$ therein, and a plurality of arms 6, which project from the body, four arms being shown, which are equidistant and are curved laterally at the same side of and over the body, and project an equal distance beyond the other side thereof.

Upon the curved portions of the arms 6, radial extensions $6^a$ are formed of an equal length, these extensions of the arms each having a longitudinal slot $b$ therein that trends from a point near the outer end of said extension to the curved member of the radial arm. A short hub $c$ projects from the same side of the annular body 5, as do the curved members of the radial arms 6, and in the peripheral surface of said ring-like hub an annular rabbet $c'$ is formed. An annular bevel gear 7 is loosely fitted in the rabbet $c'$ and is disposed so that the teeth $d$ therein will be faced outwardly.

A threaded shaft which forms an adjusting screw 8 is provided for each arm 6, and in each of said arms and in an integral cross wall $b'$ on the outer end of the extension $6^a$ thereon, alined perforations are formed, wherein the corresponding shaft 8 is journaled, the threaded body thereof having clearance from the side walls of the respective slot $b$. Upon the innermost end portions of each threaded shaft 8 a bevel pinion 9 is formed or secured, all of these toothed pinions meshing with the teeth of the annular bevel gear 7. The end $b^2$ of each shaft or adjusting screw 8 which projects beyond the cross wall $b'$ it is journaled in, is squared to adapt it for rotation by means of an ordinary socket wrench C or any other available tool. A gripping arm is provided for an engagement with each adjusting screw 8, and essentially consists of a metal bar bent at a right angle as shown at $e$ in Fig. 1, producing two members 10, $10^a$ therefor. One member 10, of each gripping arm, is formed with a nut block $g$ near its free end, that has threaded engagement with the thread on a respective adjusting screw 8, the opposite sides of said nut block, which are flat and parallel with each other, having a loose engagement with the parallel defining walls of a slot $b$ in which the adjusting screw is located. The remaining member $10^a$ of each gripping arm projects toward the center of the opening $a$ in the frame 5, and has clearance from the radial arms 6, $6^a$.

Upon each member $10^a$ a plurality of jaws $h$ are formed, which project outward at a right angle with the member they are portions of, and the outer side surfaces of said jaws are convexed to adapt them for proper engagement with a packing ring. Upon the frame 5 a pair of handles 5ᵃ may be formed or secured, which will enable the convenient handling of the expander device.

In illustration of the use of the machine for placing a packing ring on a piston, A represents an engine piston and A' the rod thereon, these appearing in Fig. 1, the machine having a packing ring placed thereon. To mount a packing ring B on the expander device, the angular end b² on an adjusting screw 8 is engaged with a wrench C and turned in a proper direction, so as to rotate the large bevel gear ring 7 by means of the pinion 9, which in turn will correspondingly rotate the other bevel pinions 9 and move the gripping arms 10, 10ᵃ accordingly. By this adjustment of the jaws h either inward or outward as may be necessary, appropriate jaws h may be fitted into a packing ring B while it is in normal condition. The piston rod A' is now passed through the packing ring B and the opening a in the machine frame 5, which will permit the packing ring B to be presented to the periphery of the piston at an adjacent end thereof. The wrench C is now mounted upon one of the adjusting screws 8, which can be most conveniently reached, and upon turning it in a proper direction the ring B can be expanded evenly so as to enlarge its diameter, and permit it to be slipped upon the end of the piston A. The screw 8 is now reversely turned, which will release the packing ring from the jaws h and permit a removal of the machine from the piston rod. Obviously after the packing ring is positioned on the piston, it may be pressed sidewise until it registers with the channel i in the piston, whereupon the instant contraction of the resilient packing ring will cause it to assume a normal condition within the channel, for its service as spring packing for the piston. In case two rings B are provided for a piston, the pair of rings may be placed thereon by use of the ring expanding machine as hereinbefore explained.

It is apparent that the two jaws h on each arm 10, are adapted for engaging with packing rings of different diameters, the outer jaws being used for rings of greater diameter than those which the inner jaws will engage. The device may also be used as a ring holder, if filing or drilling is to be done on the packing ring. In this case, the jaws h are caused to grip the ring on its outer surface, and compress it sufficiently to hold the ring firmly, which will not injure it and will permit the entire device and ring to be held stationary in a vise, so that work may be done on the packing ring.

Having thus described my invention, I claim as new and desire to secure by Letters Patent:

A packing ring expander, comprising an annular frame provided with outwardly projecting longitudinally slotted arms, a screw threaded rod mounted for rotation on each arm, a gripping arm in connection with each rod, a nut in connection with the arm through which the rod is threaded, said nut being slidable in the slot of the adjacent arm, said first named arms being angular in form, and provided with laterally projecting gripping jaws of lesser length than the width of the ring to be gripped, and means for rotating the rods in unison.

In testimony whereof I have signed my name to this specification in the presence of two subscribing witnesses.

WALTER HENRY RICHARDSON.

Witnesses:
P. R. HOPKINS,
JOHN E. YOUNG.